(12) United States Patent  (10) Patent No.: US 7,874,196 B2
Ratner  (45) Date of Patent: Jan. 25, 2011

(54) ERGONOMIC PNEUMATIC CALIBRATION POWER

(75) Inventor: Cary Ratner, 38 Overlook Ter., East Hills, NY (US) 11577

(73) Assignee: Cary Ratner, East Hills, NY (US)

( * ) Notice: Subject to any disclaimer, the term of this patent is extended or adjusted under 35 U.S.C. 154(b) by 570 days.

(21) Appl. No.: 11/881,196

(22) Filed: Jul. 27, 2007

(65) Prior Publication Data

US 2009/0025797 A1  Jan. 29, 2009

(51) Int. Cl.
*G01L 27/00* (2006.01)
(52) U.S. Cl. .................................................. 73/1.57
(58) Field of Classification Search ................. 73/1.57
See application file for complete search history.

(56) References Cited

U.S. PATENT DOCUMENTS

| 3,177,432 | A | * | 4/1965 | Kelln | 455/173.1 |
| 3,531,822 | A | * | 10/1970 | Bush | 16/409 |
| 4,698,998 | A | * | 10/1987 | Varnagy | 73/1.68 |
| 5,324,181 | A | * | 6/1994 | McGoldrick et al. | 73/1.68 |
| 6,318,155 | B1 | * | 11/2001 | Carr | 73/49.7 |
| 2002/0108671 | A1 | * | 8/2002 | Campbell et al. | 141/38 |

* cited by examiner

*Primary Examiner*—Hezron Williams
*Assistant Examiner*—Alex Devito

(57) ABSTRACT

A pressure calibration pump comprises a manifold having a port for connection to a reference device and a port for connection to a device to be calibrated. A piston is operated by two handles to pressurize air in the manifold. A pressure adjustment knob is provided to adjust the pressure of air in the manifold and a vent valve, operated by a vent knob is provided to vent air from the manifold. The vent knob is positioned within and concentric with the adjustment knob.

6 Claims, 3 Drawing Sheets

ERGONOMIC PNEUMATIC CALIBRATION POWER

BACKGROUND

In the field of pressure calibration, the need to generate a positive or negative pressure is required. This need occurs when the sensor is removed or isolated from the system for purposes of calibration. Generally, for pressures 600 psi and under, this pressure is achieved pneumatically, and using a hand pump. While prior art exists for numerous versions of a pneumatic calibration pump, the invention presented here addresses the deficiencies of the existing designs.

BRIEF DISCUSSION

When doing pressure calibration, a reference device is connected in common with a sensor to be calibrated. Then this pair is connected to a pressure source to apply a common pressure. This invention provides a means for generating this pressure.

This invention has a port on the top and one on the side. A reference device is connected to one port and the device to be calibrated is connected to the other port.

The vent knob is turned and the handles are squeezed together. This operates a piston and several valves to build up pressure in the top portion of the pump. The user squeezes the handles together until he achieves the pressure desired. The large knob referred to as the vernier knob, is used to adjust the reference pressure either up or down. Prior art, utilizes a needle valve as a vent valve. A pointed, needle like shaft, is inserted or removed into a tapered hole for the release of the common pressure. This invention utilizes a type of valve called a Schrader valve, which uses a pin connected to a elastic covered metal circle, which when moving up and down, acts to block off the escaping air.

It is often required to calibrate, on descending pressures. Usually this is achieved by gradually opening the vent valve to allow air to escape. Measurements are made at various descending points. Needle valves allow the air to escape too rapidly to successfully capture different pressures. The threads on the vent valve shaft allow the air to escape from the Schrader valve, permitting a slower release of pressure.

FULL DESCRIPTION

This pump operates as follows: when the ergonomic handles (7), with the finger cushions (19) are squeezed together a piston (6) compresses the air in the manifold (9). This causes the pressure valve and o ring to admit pressure into the upper manifold (5). When the handles are released the pressurized air remains in the upper manifold.

The pressure is held by a Schrader or pin valve (3). To release pressure, the pressure release knob (3) is rotated counter clockwise depressing the pin in the pin valve (3). The pressurized air exits the pump by traveling over the threads of the vernier piston (4) which restricts the flow slightly. Fine adjustment is achieved by rotating the vernier knob (1) in either direction, which is connected to vernier piston (4) located in a variable volume chamber in vernier body (21). By changing the volume in the vernier body (21) the pressure either increases or decreases.

The retraction of the piston is accomplished by a spring (20) which is covered by a spring cover (8) to prevent pinching the user.

When the user chooses to switch from pressure to vacuum, the shuttle valve (10) is shifted to the opposite position and the vacuum valve (13) acts to open only when the piston is retracting, so as to create a vacuum in the upper manifold (5).

FULL DESCRIPTION OF DRAWINGS

Figure 1:
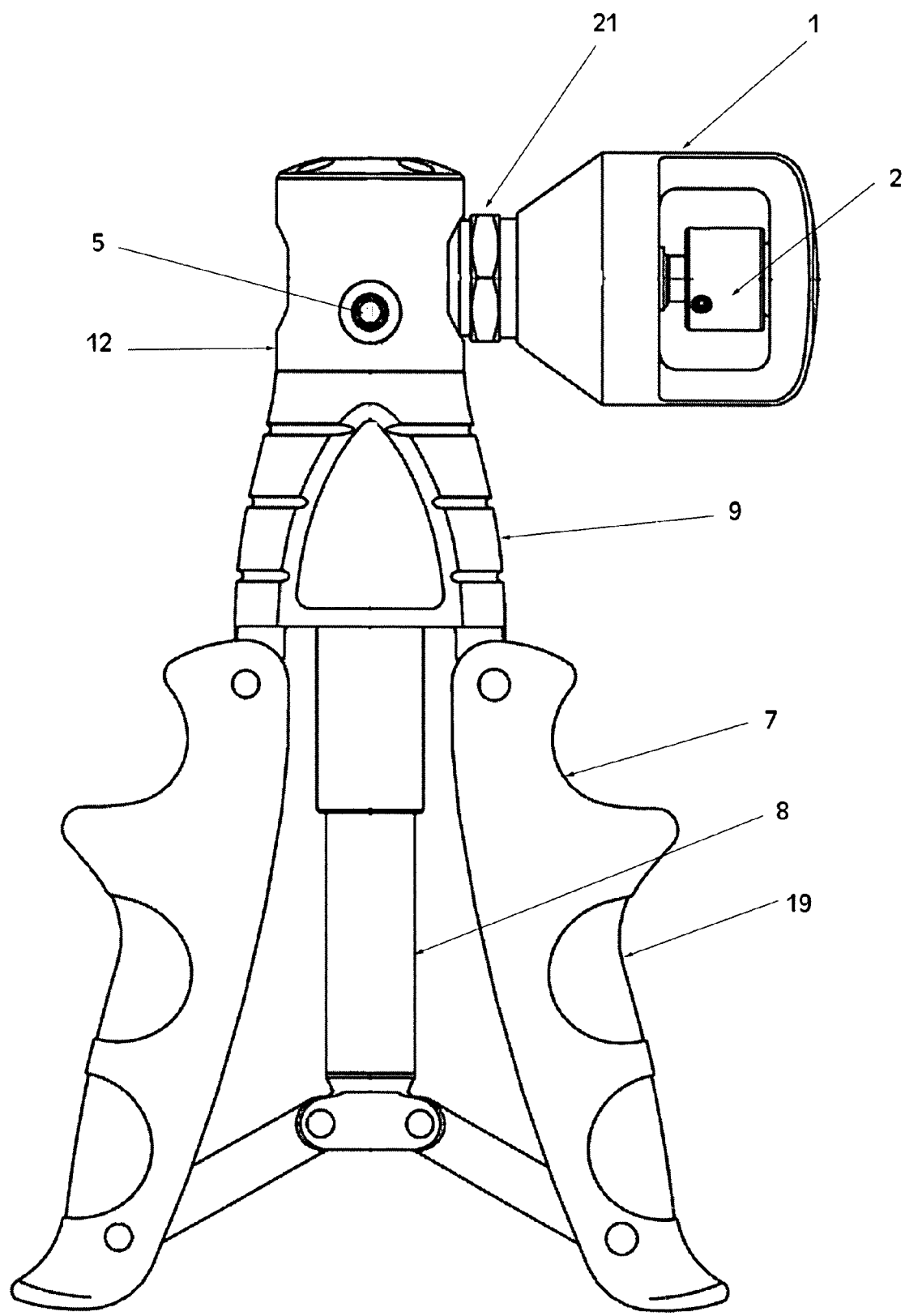
FIG. 1 is the Front view

FIG. 1 shows the complete pump from the front. This includes: vernier knob (1), vent knob (2), vernier body (21), upper manifold (12), pressure/vacuum switch (5), lower manifold (9), I ergonomic handles (7), with molded in cushion grips (19), and spring cover (8).

Figure 2:
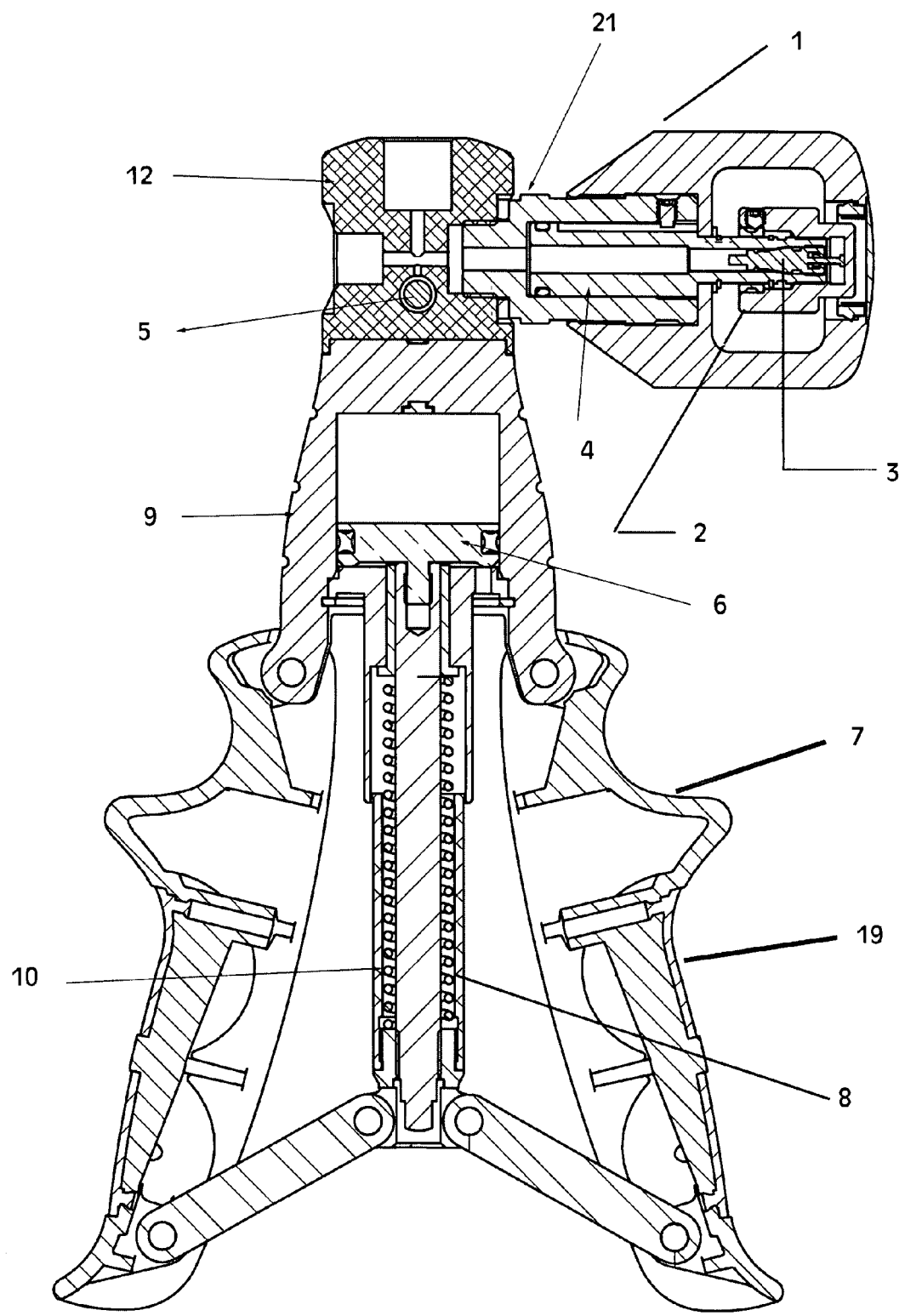
FIG. 2 is the cross section of the Front view
Figure 3:
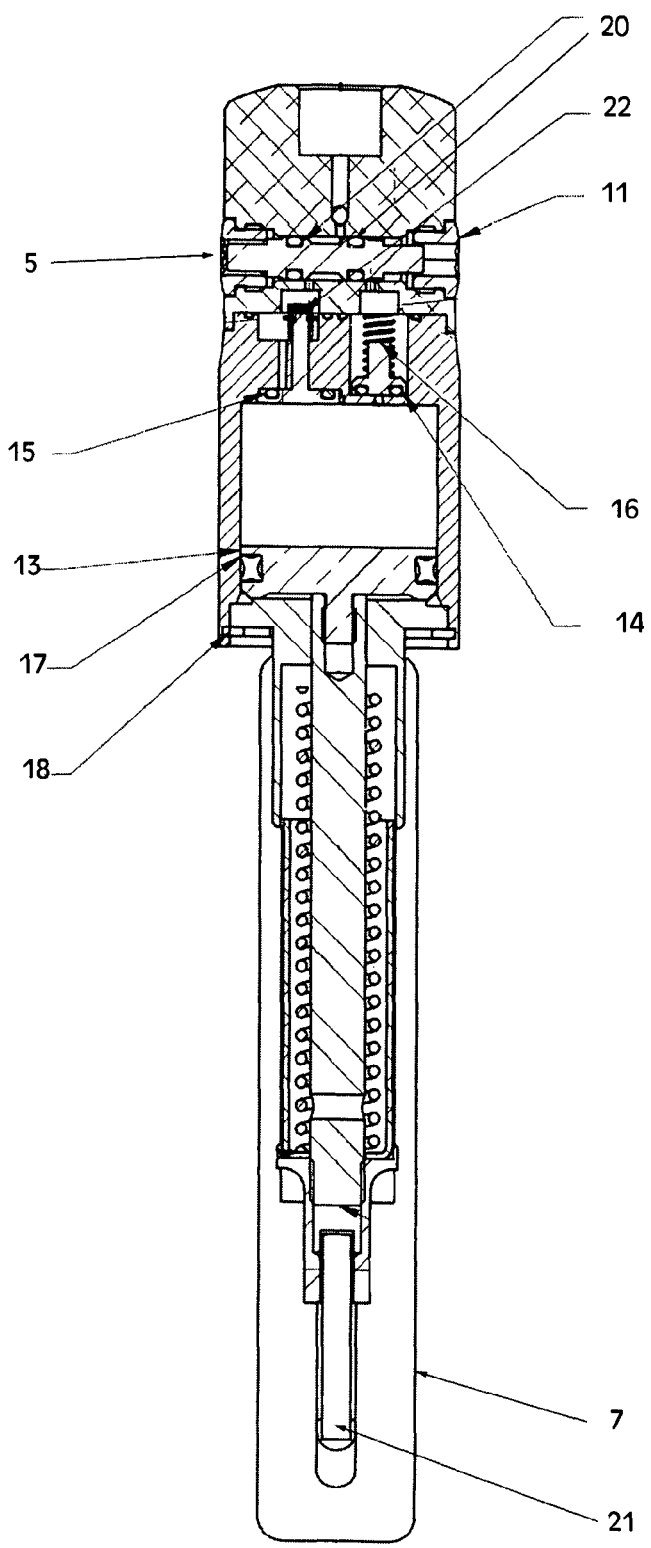
FIG. 3 is the cross section of the Side view
Bottom not shown, because it forms no part of the claimed design.

FIG. 2 shows the front pump cross sectioned, vernier knob (1), vent knob (2), vernier body (21), upper manifold (12), pressure/vacuum switch (5), lower manifold (9), ergonomic handles (7), with molded in cushion grips (19). Also included is the pump piston (6), pump spring (10), spring cover (8), vent valve (3), vernier piston (4), FIG. 3 shows the side view cross sectioned, upper manifold (12), pressure/vacuum switch (5), pressure/vacuum switch o rings (20), retaining nuts (5) lower manifold (9), ergonomic handles (7),). Also included is the pump piston (6), pump spring (10), spring cover (8), vent valve (3), vernier piston (4), main piston O ring (17), pressure check valve with o ring (14), and vacuum check valve with o ring (13), and adjustment piston shaft (21).

The invention claimed is:

1. A pressure calibration pump comprising: a manifold; a piston arranged to compress air in the manifold; a pressure adjustment knob configured to rotate to adjust the pressure of the air in the manifold by adjusting the volume of the manifold; a Schrader valve; and a vent knob operable to open the Schrader valve to release air from the manifold, wherein the vent knob is positioned entirely inside the adjustment knob, except for an opening to allow operation of the vent knob.

2. A pressure calibration pump according to claim 1, wherein the vent knob is positioned concentric with the adjustment knob.

3. A pressure calibration pump according to claim 1 wherein the Schrader valve comprises threads and is arranged to vent air from the manifold over the threads.

4. A pressure calibration pump according to claim 1, further comprising handles arranged to be squeezed together to operate the piston.

5. A pressure calibration pump according to claim 4 wherein the handles comprise cushioned pads.

6. A pressure calibration pump according to claim 1 wherein the manifold has two ports, one of which is for connection to a device to be calibrated and one of which is for connection to a reference device.

* * * * *